US009796598B2

(12) United States Patent
Hori et al.

(10) Patent No.: US 9,796,598 B2
(45) Date of Patent: Oct. 24, 2017

(54) METHOD FOR PRODUCING POTASSIUM TITANATE

(71) Applicant: TOHO TITANIUM CO., LTD., Chigasaki-shi, Kanagawa (JP)

(72) Inventors: Naomichi Hori, Chigasaki (JP); Takuma Yoshida, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 14/777,972

(22) PCT Filed: Mar. 14, 2014

(86) PCT No.: PCT/JP2014/056861
§ 371 (c)(1),
(2) Date: Sep. 17, 2015

(87) PCT Pub. No.: WO2014/148374
PCT Pub. Date: Sep. 25, 2014

(65) Prior Publication Data
US 2016/0272504 A1    Sep. 22, 2016

(30) Foreign Application Priority Data
Mar. 18, 2013    (JP) .................. 2013-054886

(51) Int. Cl.
*C01G 23/00*    (2006.01)
*B02C 17/14*    (2006.01)

(52) U.S. Cl.
CPC ............ *C01G 23/005* (2013.01); *B02C 17/14* (2013.01); *C01P 2004/61* (2013.01)

(58) Field of Classification Search
CPC ............................. C01G 23/005; B02C 17/14
See application file for complete search history.

(56) References Cited

U.S. PATENT DOCUMENTS

| | | | | |
|---|---|---|---|---|
| 3,328,117 A | * | 6/1967 | Emslie .................. | C01G 23/005 106/449 |
| 5,366,816 A | * | 11/1994 | Harada ................ | C01G 23/005 423/598 |
| 5,405,592 A | * | 4/1995 | Edler .................... | C04B 35/591 423/344 |
| 5,780,185 A | * | 7/1998 | Oki ....................... | H01M 4/485 429/231.2 |
| 2010/0112350 A1 | | 5/2010 | Tanimizu et al. | |
| 2010/0209333 A1 | | 8/2010 | Hori et al. | |
| 2014/0065565 A1 | | 3/2014 | Hori et al. | |

FOREIGN PATENT DOCUMENTS

| | | |
|---|---|---|
| CN | 102839424 A | 12/2012 |
| EP | 2138461 A1 | 12/2009 |
| JP | 63-95116 A | 4/1988 |
| JP | 63-260821 A | 10/1988 |
| JP | 4-280815 A | 10/1992 |
| JP | 2003-146658 A | 5/2003 |
| JP | 2008-110918 A | 5/2008 |

OTHER PUBLICATIONS

Konnai, "Non-Fibrous Potassium Titanate 'TIBREX'", Journal of the Mining and Materials Processing Institute of Japan, of May 25, 2001, vol. 117, No. 5, pp. 441 to 443, Cited in ISR (5 pages).
Fujiki, "Growth Reactions of Potassium Titanate Fibers by Slow-cooling Calcination Method", The Ceramic Association of Japan, 1983, pp. 189-196, vol. 91, No. 4, Cited in ISR (8 pages).
International Search Report dated Jun. 17, 2014, issued in counterpart International Application No. PCT/JP2014/056861 (3 pages).
Office Action dated Aug. 3, 2016, issued in counterpart Chinese Patent Application No. 201480016914.5, with English translation. (10 pages).
Second Notification of Reasons for Refusal dated Feb. 27, 2017, issued in counterpart Chinese Application No. 201480016914.5, with English translation. (13 pages).
Extended (supplementary) European Search Report dated Oct. 19, 2016, issued in counterpart Application No. 14768064.9. (7 pages).

* cited by examiner

*Primary Examiner* — Matthew E Hoban
*Assistant Examiner* — James Fiorito
(74) *Attorney, Agent, or Firm* — Westerman, Hattori, Daniels & Adrian, LLP

(57) ABSTRACT

A method for producing a potassium titanate easily and inexpensively produces a potassium titanate that exhibits high thermal stability and has a significantly low fibrous potassium titanate content. The method for producing a potassium titanate includes calcining a raw material mixture by heating the raw material mixture to a maximum calcination temperature that exceeds 1000° C. while controlling the heating rate from 1000° C. to the maximum calcination temperature to 15° C./min or less to obtain a calcine, and cooling the calcine while controlling the cooling rate from the maximum calcination temperature to 500° C. to 100° C./min or more, followed by grinding, the raw material mixture including a titanium compound and a potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3.

3 Claims, No Drawings

METHOD FOR PRODUCING POTASSIUM TITANATE

TECHNICAL FIELD

The present invention relates to a method for producing a potassium titanate.

BACKGROUND ART

A potassium titanate is useful as a friction material for forming a friction sliding member (e.g., brake lining, disc pad, and clutch facing) that is included in a braking device used for automobiles, railroad vehicles, airplanes, industrial machines, and the like. A potassium titanate is represented by the general formula: $K_2O \cdot nTiO_2$ (wherein n is an integer from 1 to 12). In particular, potassium hexatitanate represented by $K_2O \cdot 6TiO_2$ (n=6) has a tunnel crystal structure, and it has been known that a friction material that includes fibrous potassium hexatitanate (fibrous potassium hexatitanate particles) exhibits excellent heat resistance and the like.

However, a fibrous potassium titanate is bulky, and exhibits inferior formability. Moreover, it is difficult to uniformly disperse a fibrous potassium titanate in a friction material due to low fluidity (i.e., a fibrous potassium titanate is difficult to handle).

Patent Document 1 (JP-A-4-280815) discloses a method that produces a particulate potassium titanate (instead of a fibrous potassium titanate) by pouring a titanium tetrachloride aqueous solution into an aqueous solution of a dibasic or tribasic carboxylic acid (e.g., oxalic acid) (that is heated to 50° C. or more), filtering the resulting hydrous titanium dioxide-organic acid condensate, followed by washing with water to obtain an aqueous suspension, adding potassium hydroxide to the aqueous suspension, and reacting the mixture at a temperature of 50° C. or more and a pH of 8 or more, followed by filtration, washing with water, and drying.

It is normally desirable that a potassium titanate powder used for a friction material have a specific surface area of 5 to 10 $m^2/g$. However, since the potassium titanate powder disclosed in Patent Document 1 has a specific surface area as large as 100 $m^2/g$ or more, it is difficult to sufficiently improve friction properties.

A method that mixes a titanium compound and a potassium compound, and calcines the mixture to produce a rod-like or columnar potassium titanate (instead of a fibrous potassium titanate) has been studied. According to this method, however, it is difficult to suppress the growth of potassium titanate crystals in the longitudinal direction (major axis direction), and a considerable amount of fibrous potassium titanate is included in the product. Moreover, since it is necessary to perform a component adjustment process (e.g., pH adjustment or washing with an acid) after calcination, it is impossible to easily produce the desired potassium titanate.

RELATED-ART DOCUMENT

Patent Document

Patent Document 1: JP-A-4-280815

DISCLOSURE OF THE INVENTION

Technical Problem

In view of the above situation, an object of the invention is to provide a method that can easily and inexpensively produce a potassium titanate that exhibits high thermal stability and has a significantly low fibrous potassium titanate content.

Solution to Problem

The inventors of the invention conducted extensive studies in order to solve the above technical problem. As a result, the inventors found that the above technical problem can be solved by calcining a raw material mixture by heating the raw material mixture to a maximum calcination temperature that exceeds 1000° C. while controlling the heating rate from 1000° C. to the maximum calcination temperature to 15° C./min or less to obtain a calcine, and cooling the calcine while controlling the cooling rate from the maximum calcination temperature to 500° C. to 100° C./min or more, followed by grinding, the raw material mixture including a titanium compound and a potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3. This finding has led to the completion of the invention.

Specifically, one aspect of the invention provides the following method for producing a potassium titanate.

(1) A method for producing a potassium titanate including calcining a raw material mixture by heating the raw material mixture to a maximum calcination temperature that exceeds 1000° C. while controlling the heating rate from 1000° C. to the maximum calcination temperature to 15° C./min or less to obtain a calcine, and cooling the calcine while controlling the cooling rate from the maximum calcination temperature to 500° C. to 100° C./min or more, followed by grinding, the raw material mixture including a titanium compound and a potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3.

(2) The method for producing a potassium titanate according to (1), wherein the grinding is performed using a vibrating rod mill.

Advantageous Effects of the Invention

One aspect of the invention thus provides a method that can easily and inexpensively produce a potassium titanate that exhibits high thermal stability and has a significantly low fibrous potassium titanate content.

DESCRIPTION OF EMBODIMENTS

A method for producing a potassium titanate (hereinafter may be referred to as "production method") according to one embodiment of the invention includes calcining a raw material mixture by heating the raw material mixture to a maximum calcination temperature that exceeds 1000° C. while controlling the heating rate from 1000° C. to the maximum calcination temperature to 15° C./min or less to obtain a calcine, and cooling the calcine while controlling the cooling rate from the maximum calcination temperature to 500° C. to 100° C./min or more, followed by grinding, the raw material mixture including a titanium compound and a potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3.

The titanium compound used when implementing the production method according to one embodiment of the invention serves as a titanium source for producing a potassium titanate by calcination. It is preferable to use a titanium compound that is suitable for producing potassium hexatitanate as the potassium titanate.

The titanium compound may be one or more titanium compounds selected from compounds such as titanium dioxide, titanium suboxide, orthotitanic acid (and salts thereof), metatitanic acid (and salts thereof), titanium hydroxide, and peroxotitanic acid (and salts thereof), and titanium ores such as ilmenite. Among these, titanium dioxide is preferable.

Titanium dioxide may suitably be used as the titanium compound since titanium dioxide exhibits excellent miscibility (mixability) and reactivity with the potassium compound, and is inexpensive.

It is preferable to use rutile-type titanium dioxide or anatase-type titanium dioxide, and more preferably anatase-type titanium dioxide.

It is possible to easily obtain a potassium titanate having a large crystal grain size (crystal size) (i.e., a potassium titanate having a small specific surface area) by utilizing rutile-type titanium dioxide as the titanium compound.

The average particle size of the titanium compound used when implementing the production method according to one embodiment of the invention is preferably 0.1 to 10 mm, more preferably 0.5 to 10 mm, and still more preferably 0.5 to 1 mm, from the viewpoint of ease of handling.

Note that the term "average particle size" used herein in connection with the titanium compound refers to a value measured in accordance with JIS K 0069 ("Test methods for sieving of chemical products").

It is preferable that the titanium compound used when implementing the production method according to one embodiment of the invention be in the form of particles, and more preferably in the form of aggregates or granulated products. When the titanium compound is in the form of aggregates or granulated products, the titanium compound can be uniformly (homogenously) mixed with the potassium compound.

Aggregates (including granules) or granulated products of titanium dioxide are preferable as the aggregates or the granulated products of the titanium compound.

The term "aggregates" used herein in connection with the titanium compound refers to large particles (including granules) that are (n+1)th-order particles (wherein n is an integer equal to or larger than 1) formed by aggregation of nth-order particles of the titanium compound (e.g., secondary particles formed by aggregation of primary particles of the titanium compound, or tertiary particles formed by aggregation of secondary particles of the titanium compound), and have an average particle size of 0.1 mm or more.

The term "granulated products" used herein in connection with the titanium compound refers to products that are obtained by granulating a potassium titanate powder, and have an average particle size of 0.1 mm or more.

The aggregates or the granulated products of the titanium compound used when implementing the production method according to one embodiment of the invention have an average particle size of 0.1 mm or more, preferably 0.5 to 10 mm, and more preferably 0.5 to 1 mm.

Note that the term "average particle size" used herein in connection with the aggregates or the granulated products of the titanium, compound refers to a value measured in accordance with JIS K 0069 ("Test methods for sieving of chemical products").

Examples of the aggregates of titanium dioxide include aggregates of titanium dioxide produced using titanium sulfate or titanyl sulfate (titanium oxide produced by a sulfuric acid method), aggregates of titanium dioxide produced by subjecting titanium tetrachloride to gas-phase oxidation or hydrolysis (titanium oxide produced by a gas-phase method), aggregates of titanium dioxide produced by neutralizing or hydrolyzing a titanium tetrachloride aqueous solution or an alkoxytitanium.

Titanium oxide produced by the sulfuric acid method, titanium oxide produced by the gas-phase method, and titanium dioxide produced by neutralizing or hydrolyzing a titanium tetrachloride aqueous solution or an alkoxytitanium are normally used as an end product (e.g., titanium oxide pigment) after subjecting aggregated particles (clinkers) obtained during the production process to grinding, disintegration, classification, or the like (particle size adjustment) to remove large particles. When using the aggregates of titanium dioxide as the titanium compound used when implementing the production method according to one embodiment of the invention, it is preferable to use the clinkers directly as the aggregates of titanium dioxide.

When the clinkers are used as the aggregates of titanium dioxide, the clinkers can be uniformly mixed with the potassium compound since adhesion of the mixture can be suppressed, and the desired potassium titanate can be produced without performing a component adjustment process or the like.

Examples of the granulated products of titanium dioxide include granulated products of titanium dioxide obtained by granulating commercially-available titanium oxide fine particles by spray-drying, granulated products of titanium dioxide obtained by adding a binder to commercially-available titanium oxide fine particles, and granulating the mixture, and the like.

When the granulated products of titanium dioxide are used as the titanium compound, and mixed with the potassium compound using a mechanical mixer (mixing device) that applies a large amount of grinding energy (e.g., vibrating mill), it is possible to effectively suppress adhesion of the mixture to the inner wall of the mixer (e.g., vibrating mill), and uniformly mix the titanium compound and the potassium compound.

The potassium compound used when implementing the production method according to one embodiment of the invention serves as a potassium source for producing a potassium titanate by calcination. It is preferable to use a potassium compound that is suitable for producing potassium hexatitanate as the potassium titanate.

The potassium compound used when implementing the production method according to one embodiment of the invention may be one or more potassium compounds selected from potassium oxide, potassium carbonate, potassium hydroxide, potassium oxalate, and the like. It is preferable to use potassium carbonate as the potassium compound. These potassium compounds are melted or decomposed during calcination, and easily react with the titanium compound. Moreover, since these potassium compounds merely produce carbon dioxide, water, and the like upon decomposition, impurities rarely remain in the product.

It is preferable that the potassium compound used when implementing the production method according to one embodiment of the invention be in the form of particles. The average particle size of the potassium compound is preferably 0.1 to 10 mm, more preferably 0.5 to 10 mm, and still more preferably 0.5 to 1 mm, from the viewpoint of ease of handling.

Note that the term "average particle size" used herein in connection with the potassium compound refers to a value measured in accordance with JIS K 0069 ("Test methods for sieving of chemical products").

The raw material mixture used when implementing the production method according to one embodiment of the invention includes the titanium compound and the potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3 (i.e., the number of moles of the titanium compound on a titanium atom basis is 2.7 to 3.3 (mol) based on 1 mol of the potassium compound on a potassium atom basis).

The raw material mixture used when implementing the production method according to one embodiment of the invention includes the titanium compound and the potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3. It is preferable that the raw material mixture include the titanium compound and the potassium compound so that the molar ratio (number of moles of titanium compound on a titanium atom basis/ number of moles of potassium compound on a potassium atom basis) of the number of moles of the titanium compound on a titanium atom basis to the number of moles of the potassium compound on a potassium atom basis is 2.7 to 3.0.

It is possible to advantageously produce potassium hexatitanate ($K_2O \cdot 6TiO_2$) as the potassium titanate using the production method according to one embodiment of the invention when the raw material mixture includes the titanium compound and the potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is within the above range.

The raw material mixture used when implementing the production method according to one embodiment of the invention may further include a metallic titanium powder or a titanium hydride powder in addition to the titanium compound and the potassium compound (as described later). Since the metallic titanium powder or the titanium hydride powder is oxidized to produce titanium dioxide that forms the potassium titanate, the mixing ratio is adjusted provided that the titanium source for producing the potassium titanate includes the metallic titanium powder or the titanium hydride powder.

When implementing the production method according to one embodiment of the invention, the composition of the potassium titanate (final product) can be easily controlled by adjusting the mixing ratio of the titanium compound and the potassium compound included in the raw material mixture.

It is preferable that the raw material mixture used when implementing the production method according to one embodiment of the invention include the titanium compound and the potassium compound in a ratio of 85 to 100 mass %, and more preferably 85 to 97 mass % (on a solid basis).

The raw material mixture used when implementing the production method according to one embodiment of the invention may further include a lithium compound (e.g., lithium carbonate) and an alkaline-earth metal compound (e.g., magnesium compound and barium compound) in addition to the titanium compound and the potassium compound.

When the raw material mixture includes a lithium compound (e.g., lithium carbonate), it is possible to easily control the shape of the resulting potassium titanate (so that the potassium titanate has the desired shape).

When the raw material mixture includes an alkaline-earth metal compound (e.g., magnesium compound and barium compound), it is possible to easily control the shape of the resulting potassium titanate (so that the potassium titanate has the desired shape) while suppressing production of fibrous crystals during calcination (described later).

The raw material mixture used when implementing the production method according to one embodiment of the invention may include a small amount of an additional compound such as an inorganic oxide in addition to the titanium compound and the potassium compound as long as production of the potassium titanate is not affected.

The inorganic oxide may be one or more inorganic oxides selected from $Fe_2O_3$, $Al_2O_3$, $SiO_2$, $CeO_2$, $WO_3$, $ZrO_2$, $Zr(CO_3)_2$, $CaCO_3$, and the like.

When the raw material mixture used when implementing the production method according to one embodiment of the invention further includes the inorganic oxide in addition to the titanium compound and the potassium compound, the (total) content (on a solid basis) of the inorganic oxide in the raw material mixture is preferably 5 mass % or less, more preferably 3 mass % or less, and still more preferably 1 mass % or less.

The raw material mixture used when implementing the production method according to one embodiment of the invention is preferably prepared using a given amount of alcohol.

The alcohol may be one or more alcohols selected from methanol, ethanol, amyl alcohol, allyl alcohol, propargyl alcohol, ethylene glycol, propylene glycol, erythrol, 2-butene-1,4-diol, glycerol, pentaerythritol, arabitol, sorbitol, pentitol, polyethylene glycol, polypropylene glycol, polyglycerol, and the like. Among these, methanol and ethanol that have a relatively low boiling point are preferable.

The raw material mixture used when implementing the production method according to one embodiment of the invention may be prepared by mixing the desired amounts of the titanium compound and the potassium compound optionally together with the inorganic oxide and the like (as described later). It is preferable to grind and mix the titanium compound and the potassium compound while vaporizing the alcohol by heating the inside of the mixer to a temperature equal to or higher than the boiling point of the alcohol. This makes it possible to obtain the raw material mixture in which the titanium compound and the potassium compound are more uniformly dispersed while suppressing adhesion of the titanium compound and the like inside the mixer.

The raw material mixture used when implementing the production method according to one embodiment of the invention preferably further includes a given amount of an additive such as an aggregation inhibitor and a lubricant.

It is preferable that the additive be decomposed, combusted, or vaporized when the raw material mixture that includes the titanium compound and the potassium compound is calcined, and does not remain in the resulting potassium titanate. Examples of such an additive include a cellulose, a fatty acid, a sugar, grain, urea (and derivatives thereof), a polymer, and the like.

The additive may be one or more materials selected from methyl cellulose, lignin, a wood powder, a pulp powder, a natural fiber powder, stearic acid, ammonium stearate, sorbitan distearate, a sugar such as xylose, glucose, galactose, sucrose, starch, and dextrin, flour, soy flour, rice flour, sugar, urea, biurea, semicarbazide, guanidine carbonate, aminoguanidine, azodicarbonamide, an acrylic resin powder, a polypropylene powder, a polythene powder, a polystyrene powder, and the like. The additive is particularly preferably one or more materials selected from a wood powder, a pulp powder, and a natural fiber powder that are a solid powder or solid pellets.

When the raw material mixture used when implementing the production method according to one embodiment of the invention further includes the alcohol and the additive in addition to the titanium compound and the potassium compound, the total content of the alcohol and the additive in the raw material mixture is preferably 0.1 to 3.0 mass %, and more preferably 0.3 to 1.0 mass %.

The raw material mixture used when implementing the production method according to one embodiment of the invention may further include a metallic titanium powder or a titanium hydride powder.

In this case, the raw material mixture preferably includes the metallic titanium powder or the titanium hydride powder in an amount of 0.01 to 0.2 mol, and more preferably 0.03 to 0.1 mol, based on 1 mol of the titanium atoms included in the titanium compound.

When the raw material mixture used when implementing the production method according to one embodiment of the invention includes the metallic titanium powder or the titanium hydride powder, the metallic titanium powder or the titanium hydride powder is burned inside the reaction vessel during calcination together with the titanium compound and the potassium compound, and suppresses an uneven temperature distribution inside the reaction vessel, and the reaction can be effected more uniformly. This makes it possible to easily obtain a potassium titanate having the desired composition.

The raw material mixture used when implementing the production method according to one embodiment of the invention may be prepared by mixing the titanium compound and the potassium compound optionally together with the inorganic oxide and the like. The components may be mixed using a dry mixing method or a wet mixing method. It is preferable to use a dry mixing method from the viewpoint of simplifying the process.

The titanium compound and the potassium compound are preferably mixed (optionally together with the inorganic oxide and the like) using a known mixing means. It is preferable to use one or more mixing means selected from mechanical grinding means such as a vibrating mill, a vibrating rod mill, a vibrating ball mill, a bead mill, a turbo mill, and a planetary ball mill. It is more preferable to use a vibrating rod mill that utilizes (is charged with) rods as ground media.

When mixing the components using the vibrating rod mill, the amplitude is preferably set to 2 to 6 mm, and the mixing (processing) time is preferably set to 10 to 120 minutes.

It is possible to mix the titanium compound and the potassium compound while co-grinding the titanium compound and the potassium compound by utilizing the vibrating rod mill. Specifically, it is possible to grind a powder having a (relatively) large particle size between the rods while suppressing a situation in which a fine powder is ground to a large extent (that may occur when using a ball mill).

In particular, when titanium oxide (that normally exhibits high adhesion due to a hydroxyl group present on the surface, and has a larger specific surface area as the particle size decreases) is used as the titanium compound, ground products easily adhere to the inner side of the device when titanium oxide is ground to a large extent. It is possible to suppress such a situation (i.e., ground products adhere to the inner side of the device) by utilizing the vibrating rod mill, and uniformly grind and mix the components as compared with other mixing methods.

The vibrating rod mill also makes it possible to grind and disintegrate large titanium dioxide particles while suppressing a situation in which a fine powder (e.g., primary particles) is ground to a large extent even when aggregates or granulated products of titanium dioxide are used as the titanium compound, and suppress a situation in which adhesion of titanium dioxide occurs inside the device (i.e., ensure that the components are uniformly mixed).

When preparing the raw material mixture used when implementing the production method according to one embodiment of the invention by mixing the titanium compound and the potassium compound (optionally together with the inorganic oxide and the like) using a wet mixing method, one or more solvents selected from purified water, an organic solvent such as an alcohol, acetone, MEK, and THF, and the like may be used as a mixing solvent. It is preferable to use a surfactant or a dispersant together with the mixing solvent in order to improve the dispersibility of the mixed powder (i.e., achieve uniform mixing).

When implementing the production method according to one embodiment of the invention, the raw material mixture that includes the titanium compound and the potassium compound is calcined by heating the raw material mixture to the maximum calcination temperature that exceeds 1000° C. while controlling the heating rate from 1000° C. to the maximum calcination temperature to 15° C./min or less.

When implementing the production method according to one embodiment of the invention, the raw material mixture may be calcined in a state in which the raw material mixture is contained in a reaction vessel, or a binder and the like may be added to the raw material mixture, and the mixture may be formed to have the desired shape, and calcined, or the raw material mixture may be calcined in a fluid state using a rotary kiln or the like. It is preferable to calcine the raw material mixture in a fluid state using a rotary kiln or the like taking account of the calcination profile employed for the production method according to one embodiment of the invention.

It is preferable that the reaction vessel or the furnace used for calcination (performed when implementing the production method according to one embodiment of the invention) be made of a ceramic. Specific examples of the ceramic material include alumina and the like. The reaction vessel or the furnace used for calcination may have a cylindrical shape, a columnar shape provided with a recess, a square shape provided with a recess, a dish-like shape, or the like.

When the raw material mixture is brought into contact with a reaction vessel or a furnace made of a ceramic, it is preferable to provide a sheet member formed of a material that is carbonized during calcination to an area in which the raw material mixture comes in contact with the reaction vessel or the furnace.

The sheet member (that is formed of a material that is carbonized during calcination) is preferably formed of a material that is burned off during calcination, and does not produce a soft product or fluid. The sheet member may be formed of one or more materials selected from paper, natural fibers, bark, a thermosetting resin, and the like.

When the sheet member (that is formed of a material that is carbonized during calcination) is formed of paper, it is preferable that the paper be not provided with a material that is not easily carbonized, and softens (e.g., vinyl chloride). Examples of such paper include wrapping paper (e.g., unbleached kraft paper, unglazed bleached kraft paper, and machine glazed bleached kraft paper), container board, newsprint, high-quality paper, medium-quality paper, recycled paper, book paper, cast-coated paper, coated paper, communication paper (e.g., PPC paper), and the like.

Examples of the natural fibers that may be used to produce the sheet member (that is formed of a material that is carbonized during calcination) include cotton, hemp, silk, and the like. Examples of the thermosetting resin that may be used to produce the sheet member (that is formed of a material that is carbonized during calcination) include a phenol resin, an epoxy resin, a melamine resin, and the like.

The sheet member (that is formed of a material that is carbonized during calcination) may be in the form of a sheet, a woven fabric, a nonwoven fabric, a bag, or the like.

It is possible to prevent a situation in which the potassium compound included in the raw material mixture is melted (i.e., the raw material is wasted), or the potassium compound (that has been melted) penetrates the reaction vessel or the furnace (that is made of a ceramic) by providing the sheet member (that is formed of a material that is carbonized during calcination) to an area in which the raw material mixture comes in contact with the reaction vessel or the furnace (that is made of a ceramic).

When implementing the production method according to one embodiment of the invention, it is possible to advantageously prevent a situation in which the potassium compound is wasted, or the potassium compound penetrates the reaction vessel (that is made of a ceramic) by introducing the raw material mixture in a state in which the sheet member is placed at the bottom of the recess formed in the reaction vessel (that is made of a ceramic), for example.

It is possible to more advantageously prevent a situation in which the potassium compound is wasted, or the potassium compound penetrates the reaction vessel (that is made of a ceramic) by introducing the raw material mixture in a state in which the sheet member is placed over the entire inner wall of the recess formed in the reaction vessel (that is made of a ceramic), for example.

When implementing the production method according to one embodiment of the invention, the raw material mixture is calcined by heating the raw material mixture to the maximum calcination temperature that exceeds 1000° C.

When implementing the production method according to one embodiment of the invention, the maximum calcination temperature is preferably set to more than 1000° C. and 1300° C. or less, more preferably 1100 to 1250° C., and still more preferably 1180 to 1230° C.

When the maximum calcination temperature is controlled to be within the above range, it is possible to adjust the crystal size of the potassium titanate produced using the production method according to one embodiment of the invention.

If the maximum calcination temperature is 1000° C. or less, the reaction may not proceed sufficiently. A potassium titanate having a larger crystal size can be obtained by increasing the maximum calcination temperature. If the maximum calcination temperature exceeds 1300° C., however, the production cost may increase since it is necessary to use a furnace that can withstand such a high temperature. Moreover, since the maximum calcination temperature is close to the melting point of the potassium titanate (melting point of potassium hexatitanate: 1310 to 1350° C.), the resulting potassium titanate may be melted (i.e., it may be difficult to control the shape of the resulting potassium titanate).

When implementing the production method according to one embodiment of the invention, the heating rate from 1000° C. to the maximum calcination temperature is controlled to 15° C./min or less, preferably 10° C./min or less, and more preferably 5° C./min or less.

The heating rate is preferably controlled to 1° C./min or more taking account of efficiency.

It is possible to suppress a situation in which the potassium titanate grows in the longitudinal direction (major axis direction), and easily produce columnar crystals having an increased length in the thickness direction (minor axis direction) by specifying the maximum calcination temperature and the heating rate up to the maximum calcination temperature as described above. This makes it possible to reduce the fibrous potassium titanate content in the resulting potassium titanate.

When implementing the production method according to one embodiment of the invention, the raw material mixture is preferably calcined at the maximum calcination temperature for 10 minutes or more, and more preferably 20 to 60 minutes.

It is possible to further reduce the fibrous potassium titanate content in the resulting potassium titanate by calcining the raw material mixture at the maximum calcination temperature for the above time.

When implementing the production method according to one embodiment of the invention, the calcine is cooled while controlling the cooling rate from the maximum calcination temperature to 500° C. to 100° C./min or more.

When implementing the production method according to one embodiment of the invention, the cooling rate from the maximum calcination temperature to 500° C. is preferably controlled to 100 to 200° C./min, and more preferably 100 to 150° C./min.

It is possible to further suppress a situation in which the potassium titanate grows in the longitudinal direction (major axis direction), and more easily produce columnar crystals having an increased length in the thickness direction (minor axis direction) by specifying the cooling rate from the maximum calcination temperature as described above. This makes it possible to further reduce the fibrous potassium titanate content in the resulting potassium titanate.

A calcine that includes columnar or particulate potassium titanate crystals can be obtained by performing the above calcination process, for example.

When implementing the production method according to one embodiment of the invention, the calcine obtained by the calcination process is ground.

When implementing the production method according to one embodiment of the invention, the calcine may be ground using a grinding means similar to the mixing means that is used to mix the titanium compound and the potassium compound. Specifically, the calcine may be ground using one or more grinding means selected from impact grinders (pulverizers) such as a vibrating mill, a vibrating ball mill, a vibrating rod mill, a bead mill, a turbo mill, a planetary ball mill, a hammer mill, and a pin mill, and the like. It is preferable to use a vibrating rod mill.

When grinding the calcine using the vibrating rod mill, the amplitude is preferably set to 2 to 6 mm, and the grinding (processing) time is preferably set to 10 to 120 minutes.

The calcine obtained by the calcination process includes columnar potassium titanate crystals having an increased length in the thickness direction (minor axis direction). Most of the columnar potassium titanate crystals are aggregates that exhibit relatively high adhesion, and can be ground by the grinding process to have the desired particle size.

The ground product obtained by the grinding process is optionally classified or sieved to obtain a potassium titanate that has the desired particle size distribution.

The potassium titanate produced using the production method according to one embodiment of the invention preferably has an average particle size of 20 to 120 µm, and more preferably 40 to 80 µm.

The potassium titanate produced using the production method according to one embodiment of the invention preferably has an average thickness (average minor axis) of 2 to 6 µm, and more preferably 3 to 5 µm. The potassium titanate produced using the production method according to one embodiment of the invention preferably has an average longitudinal length (average major axis) of 3 to 10 µm, and more preferably 4 to 8 µm.

The potassium titanate produced using the production method according to one embodiment of the invention preferably has an average aspect ratio (longitudinal length (major axis)/thickness (minor axis)) of 1 to 3, and more preferably 1 to 2.

Note that the term "average particle size" used herein in connection with the potassium titanate refers to a diameter that corresponds to a cumulative volume of 50% when the area of a projection image of each of about ten thousand potassium titanate particles is measured using a particle size/shape distribution analyzer ("PITA-2" manufactured by Seishin Enterprise Co., Ltd.), and the diameter of a circle having the same area as each measured area is calculated to determine a volume frequency distribution using a sphere having the diameter of each circle.

The terms "average thickness (average minor axis)" and "average longitudinal length (average major axis)" used herein in connection with the potassium titanate refer to an arithmetic mean value (number average value) when a projection image of each of about ten thousand potassium titanate particles is measured using a particle size/shape distribution analyzer ("PITA-2" manufactured by Seishin Enterprise Co., Ltd.), the maximum length of each particle (i.e., the maximum length between two arbitrary points on the contour of the projection image of each particle) is measured as the major axis, and the maximum length of each particle in the direction perpendicular to the major axis is measured as the minor axis.

The term "average aspect ratio" used herein in connection with the potassium titanate refers to an arithmetic mean value when the minor axis and the major axis of each of about ten thousand potassium titanate particles are measured as described above, and the ratio (major axis/minor axis) of the major axis to the minor axis of each particle is calculated.

The fibrous potassium titanate content in the potassium titanate produced using the production method according to one embodiment of the invention is preferably 3 mass % or less, more preferably 1 mass % or less, still more preferably 0.5 mass % or less, and yet more preferably 0.1 mass % or less.

Note that the term "fibrous potassium titanate" used herein refers to a potassium titanate particle that has a thickness (minor axis) (measured as described above) of less than 3 µm, a longitudinal length (major axis) (measured as described above) of more than 5 µm, and an aspect ratio (major axis/minor axis) (measured as described above) of 3 or more.

The term "fibrous potassium titanate content (mass %) in the potassium titanate" used herein refers to a value determined by measuring the circumferential length of a projection image of each fibrous potassium titanate (defined as described above) using a particle size/shape distribution analyzer ("PITA-2" manufactured by Seishin Enterprise Co., Ltd.), calculating the mass of each fibrous potassium titanate from the volume of a sphere having a circular cross section having the same circumference as the circumferential length of each fibrous potassium titanate, and the true density of the target potassium titanate, calculating the total mass of the fibrous potassium titanates by performing a cumulative mass calculation process, and calculating the ratio of the total mass of the fibrous potassium titanates to the total mass of the potassium titanates.

The columnar/particulate potassium titanate content in the potassium titanate produced using the production method according to one embodiment of the invention is preferably 80 to 100 mass %, more preferably 90 to 100 mass %, still more preferably 95 to 100 mass %, and yet more preferably 99.5 to 100 mass %.

Note that the term "columnar potassium titanate" used herein refers to a potassium titanate that has an (average) aspect ratio (major axis/minor axis) (measured as described above) of 2 or more and less than 3, and has an approximately columnar shape (e.g., cylindrical shape, prismatic shape, strip-like shape, approximately cylindrical shape, approximately prismatic shape, or approximately strip-like shape).

The term "particulate potassium titanate" used herein refers to a potassium titanate that has an (average) aspect ratio (major axis/minor axis) (measured as described above) of 1 or more and less than 2, and has an approximately spherical shape (e.g., granular shape, powdery shape, flaky shape, or block-like shape).

The potassium titanate produced using the production method according to one embodiment of the invention is preferably potassium hexatitanate represented by $K_2O \cdot 6TiO_2$. The potassium titanate may be a mixture of potassium hexatitanate and $TiO_2$, a mixture of potassium hexatitanate and another potassium titanate (e.g., potassium tetratitanate), or a mixture of potassium hexatitanate, another potassium titanate (e.g., potassium tetratitanate), and $TiO_2$.

The potassium titanate produced using the production method according to one embodiment of the invention may be a mixture of a potassium titanate having the above specific shape (i.e., columnar shape) and a powdery potassium titanate. The production method according to one embodiment of the invention can produce potassium hexatitanate having a low fibrous potassium hexatitanate content in high yield.

The potassium titanate produced using the production method according to one embodiment of the invention exhibits excellent heat resistance, and may suitably be used as a friction modifier and the like.

Since the production method according to one embodiment of the invention calcines the raw material mixture that includes the titanium compound and the potassium compound using a specific temperature profile, and grinds the resulting calcine, it is possible to obtain a potassium titanate compound having the desired composition that exhibits excellent crystallinity and has high purity.

The production method according to one embodiment of the invention can easily and inexpensively produce the desired potassium titanate (e.g., potassium hexatitanate) by merely calcining the raw material mixture without performing a known component adjustment process (e.g., pH adjustment or washing with an acid) after calcination.

Therefore, the production method according to one embodiment of the invention can easily and inexpensively produce a potassium titanate that exhibits high thermal stability and has a significantly low fibrous potassium titanate content.

EXAMPLES

The invention is further described below by way of examples and comparative examples. Note that the invention is not limited to the following examples.

In the examples and the comparative examples, the shape and the average particle size of the potassium titanate were measured as described above using a particle size/shape distribution analyzer ("PITA-2" manufactured by Seishin Enterprise Co., Ltd.), and the fibrous potassium titanate content was calculated as described above provided that the true specific gravity of the potassium titanate is 3.5 g/cm$^3$ (i.e., the true specific gravity of potassium hexatitanate).

Example 1

(1) A vibrating rod mill (laboratory small vibrating mill manufactured by Chuo Kakohki Co., Ltd., internal volume: 1 L, diameter: 19 mm, length: 218 mm, 464 g/rod, columnar rod media made of stainless steel (SS): 11.6 kg) was charged with 350.7 g of aggregates of titanium oxide having an average particle size of 0.8 mm, 109.5 g of a potassium carbonate powder having an average particle size of 0.5 mm, 10.5 g of a titanium powder, and 17 g of wood chips (wood pellets). After the addition of 0.5 mass % of methanol, the mixture was processed for 15 minutes at an amplitude of 5 mm and an internal temperature of 60 to 80° C. to obtain a raw material mixture (hereinafter referred to as "raw material mixture M").

(2) 5000 g of the raw material mixture M (obtained by repeating the above operation) was put in a ceramic reaction vessel (of which the upper part was open), which was placed in an electric furnace. The raw material mixture M was heated from room temperature to 1000° C. over 5 hours, heated to 1180° C. (maximum calcination temperature), and calcined at 1180° C. for 0.5 hours.

Note that the heating rate from 850° C. to 1000° C. was controlled to 35° C./min, and the heating rate from 1000° C. to the maximum calcination temperature was controlled to 6° C./min.

(3) The calcine was cooled to 100° C. over 10 minutes, cooled to room temperature, and then removed. Note that the cooling rate from the maximum calcination temperature to 500° C. was controlled to 108° C./min.

(4) The calcine was in the shape of aggregated particles. The calcine was ground using the vibrating rod mill (laboratory small vibrating mill manufactured by Chuo Kakohki Co., Ltd.), and ground using an impact pulverizer ("ACM Pulverizer" manufactured by Hosokawa Micron Corporation, provided with a classifier) to produce potassium titanate particles having an average particle size of 50 μm.

It was confirmed by X-ray powder diffraction analysis that the resulting potassium titanate particles included only potassium hexatitanate. Table 1 shows the analysis results for the resulting potassium titanate particles.

Comparative Example 1

Potassium titanate particles having an average particle size of 10 μm were produced in the same manner as in Example 1, except that the cooling rate from the maximum calcination temperature to 500° C. was controlled to 5° C./min.

It was confirmed by X-ray powder diffraction analysis that the resulting potassium titanate particles included only potassium hexatitanate. Table 1 shows the analysis results for the resulting potassium titanate particles.

Comparative Example 2

Potassium titanate particles having an average particle size of 15 μm were produced in the same manner as in Example 1, except that the heating rate from 1000° C. to the maximum calcination temperature was controlled to 20° C./min.

It was confirmed by X-ray powder diffraction analysis that the resulting potassium titanate particles included only potassium hexatitanate. Table 1 shows the analysis results for the resulting potassium titanate particles.

Example 2

20 kg of a raw material mixture M prepared in the same manner as in Example 1 (see (1)) was supplied to a rotary kiln (wherein the inner wall of the retort is made of alumina) at a rate of 20 kg/hr. The inlet temperature of the rotary kiln was set to 800° C., the maximum calcination temperature was set to 1180° C., and the outlet temperature of the rotary kiln was set to 1000° C. The total residence time in the rotary kiln was set to 40 minutes, and the residence time at the maximum calcination temperature was set to 10 minutes.

The heating rate from 1000° C. to the maximum calcination temperature was controlled to 12.6° C./min, and the cooling rate from the maximum calcination temperature to 500° C. was controlled to 108° C./min.

The calcine was ground using a vibrating rod mill ("MB-1" manufactured by Chuo Kakohki Co., Ltd.), and ground using an impact pulverizer ("ACM Pulverizer" manufactured by Hosokawa Micron Corporation, provided with a classifier) (in the same manner as in Example 1) to produce potassium titanate particles having an average particle size of 60 μm. It was confirmed by X-ray powder diffraction analysis that the resulting potassium titanate particles included only potassium hexatitanate. Table 1 shows the analysis results for the resulting potassium titanate particles.

Example 3

Potassium titanate particles having an average particle size of 45 μm were produced in the same manner as in Example 1, except that the cooling rate from the maximum calcination temperature to 500° C. was controlled to 120° C./min (see (3) in Example 1).

(° C./min)" refers to the cooling rate (° C./min) from the maximum calcination temperature to 500° C.

TABLE 1

| | Titanium compound/potassium compound (molar ratio)* | Heating rate (° C./min) | Cooling rate (° C./min) | Major component | Average particle size (μm) | Fibrous potassium titanate content** (mass %) |
|---|---|---|---|---|---|---|
| Example 1 | 2.9 | 6 | 108 | Columnar potassium titanate | 50 | 0.3 (Good) |
| Comparative Example 1 | 2.9 | 6 | 5 | Mixture of columnar potassium titanate and fibrous potassium titanate | 10 | 10 (Bad) |
| Comparative Example 2 | 2.9 | 20 | 108 | Mixture of columnar potassium titanate and fibrous potassium titanate | 15 | 5 (Bad) |
| Example 2 | 2.9 | 12.6 | 108 | Columnar potassium titanate | 60 | 0.5 (Good) |
| Example 3 | 2.9 | 6 | 120 | Columnar potassium titanate | 45 | 0.4 (Good) |
| Example 4 | 2.9 | 6 | 108 | Columnar potassium titanate | 55 | 0.5 (Good) |
| Example 5 | 2.9 | 12.6 | 108 | Columnar potassium titanate | 65 | 0.06 (Good) |

*Molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis (i.e., the number of moles of the titanium compound on a titanium atom basis based on 1 mol of the potassium compound on a potassium atom basis)
**A case where the fibrous potassium titanate content was 0.5 mass % or less was evaluated as "Good", a case where the fibrous potassium titanate content was more than 0.5 mass % and 3.0 mass % or less was evaluated as "Fair", and a case where the fibrous potassium titanate content was more than 3.0 mass % was evaluated as "Bad" (in parentheses).

It was confirmed by X-ray powder diffraction analysis that the resulting potassium titanate particles included only potassium hexatitanate. Table 1 shows the analysis results for the resulting potassium titanate particles.

Example 4

Potassium titanate particles having an average particle size of 55 μm were produced in the same manner as in Example 1, except that the heating rate from 850 to 1000° C. was controlled to 25° C./min (see (2) in Example 1).

It was confirmed by X-ray powder diffraction analysis that the resulting potassium titanate particles included only potassium hexatitanate. Table 1 shows the analysis results for the resulting potassium titanate particles.

Example 5

Potassium titanate particles having an average particle size of 65 μm were produced in the same manner as in Example 2, except that the supply rate of the raw material mixture to the rotary kiln was changed from 20 kg/hr to 15 kg/hr.

It was confirmed by X-ray powder diffraction analysis that the resulting potassium titanate particles included only potassium hexatitanate. Table 1 shows the analysis results for the resulting potassium titanate particles.

In Table 1, the item "Titanium compound/potassium compound (molar ratio)" refers to the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis (i.e., the number of moles of the titanium compound on a titanium atom basis based on 1 mol of the potassium compound on a potassium atom basis) in the raw material mixture subjected to the reaction, the item "Heating rate (° C./min)" refers to the heating rate (° C./min) from 1000° C. to the maximum calcination temperature, and the item "Cooling rate In Examples 1 to 5, a potassium titanate exhibiting high thermal stability and having a significantly low fibrous potassium titanate content could be easily and inexpensively produced by mixing the titanium compound and the potassium compound so that the molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis was 2.7 to 3.3, calcining the resulting mixture by heating the mixture to the maximum calcination temperature that exceeds 1000° C. while controlling the heating rate from 1000° C. to the maximum calcination temperature to 15° C./min or less, and cooling the resulting calcine while controlling the cooling rate from the maximum calcination temperature to 500° C. to 100° C./min or more, followed by grinding (see Table 1).

As shown in Table 1, the potassium titanate obtained in Comparative Example 1 had a high fibrous potassium titanate content since the cooling rate from the maximum calcination temperature to 500° C. was as low as 5° C./min, and the potassium titanate obtained in Comparative Example 2 also had a high fibrous potassium titanate content since the heating rate from 1000° C. to the maximum calcination temperature was as high as 20° C./min.

INDUSTRIAL APPLICABILITY

The embodiments of the invention can thus easily and inexpensively produce a potassium titanate that exhibits high thermal stability and has a significantly low fibrous potassium titanate content.

The invention claimed is:
1. A method for producing a potassium titanate comprising calcining a raw material mixture by heating the raw material mixture to a maximum calcination temperature that exceeds 1000° C. while controlling a heating rate from 1000° C. to the maximum calcination temperature to 15°

C./min or less to obtain a calcine, and cooling the calcine while controlling a cooling rate from the maximum calcination temperature to 500° C. to 100° C./min or more, followed by grinding, the raw material mixture comprising a titanium compound and a potassium compound so that a molar ratio (number of moles of titanium compound on a titanium atom basis/number of moles of potassium compound on a potassium atom basis) of the number of moles of the titanium compound on a titanium atom basis to the number of moles of the potassium compound on a potassium atom basis is 2.7 to 3.3, and wherein a columnar potassium titanate content in the potassium titanate is 80 to 100 mass %.

2. The method for producing a potassium titanate according to claim 1, wherein the grinding is performed using a vibrating rod mill.

3. The method for producing a potassium titanate according to claim 1, wherein a fibrous potassium titanate content in the potassium titanate is 3 mass % or less.

* * * * *